United States Patent [19]

Miller

[11] Patent Number: 5,366,377
[45] Date of Patent: Nov. 22, 1994

[54] METHOD OF MANUFACTURING READING MATERIALS TO IMPROVE READING SKILLS

[76] Inventor: Edward R. Miller, Rte. 3, Box 329C Windy Gap Rd., North Wilkesboro, N.C. 28659

[21] Appl. No.: 99,583
[22] Filed: Jul. 30, 1993
[51] Int. Cl.⁵ ............................................. G09B 17/00
[52] U.S. Cl. .................................. 434/178; 283/46
[58] Field of Search ................. 434/178, 184; 283/46, 283/63.1; 281/45

[56] References Cited

U.S. PATENT DOCUMENTS

| | | | |
|---|---|---|---|
| 1,539,397 | 5/1925 | Matravers | 283/46 X |
| 1,673,166 | 6/1928 | Studebaker | 283/46 |
| 4,734,036 | 3/1988 | Kasha | 434/157 |
| 5,141,439 | 8/1992 | Cousins | 434/178 |

*Primary Examiner*—Gene Mancene
*Assistant Examiner*—Cindy A. Cherichetti

[57] ABSTRACT

The invention herein pertains to a method for manufacturing reading materials to help those with certain reading disabilities. The method of manufacturing consists of altering text by deleting certain "sight" words and thereafter printing the altered text with the sight words deleted. A reading disabled person can then read and reread the altered text until his or her phonetic reading abilities are improved. More advanced text can later be manufactured and supplied to further improve reading skills.

10 Claims, 1 Drawing Sheet

METHOD OF MANUFACTURING READING MATERIALS TO IMPROVE READING SKILLS

BACKGROUND OF THE INVENTION

1. Field of the Invention

The present invention pertains to a method of producing educational materials, and specifically, to the manufacture of materials to assist students in improving their ability to read in a phonetic manner.

2. Description of the Prior Art and Objectives of the Invention

Reading was taught in schools in Colonial times in this country in a two step process. Students first learned the alphabetic code as the importance of the letters which formed words was strongly instilled and simple syllables and exercises in spelling were taught throughout the early grades. Letters were identified and taught as parts of words (e.g., "c" is for cat). Children then practiced the simple syllables and spelling exercises which were repeated over and over. Laborious instructions in letters or "phonetics" seemed the proper course and remained so in most U.S. educational systems until about the second quarter of this century. In the 1930's and 1940's reading became more focused on comprehension whereby woods were introduced through meaning first, to be recognized "holistically" by sight. Children were encouraged to recognize words associated with a picture and the identity of the word was termed "meaning-based". The earlier phonetic approach was substantially cast aside and used only as an ancillary method, as a mere supplement to the newly adopted "holistic" method of reading.

Reading disabilities are generally defined as one or more of several learning disorders and are included in a group manifested by significant difficulties in listening, speaking, reading, writing, reasoning, mathematical abilities, or social skills. Such disorders are peculiar to an individual and may occur for a variety of physical, emotional, mental, socio-environmental or other factors. One such learning disability is commonly referred to, somewhat controversially, as "dyslexia". Whatever the cause, dyslexia is a term used to label children or adults that can easily read certain words but not others.

It is now believed that "dyslexia" can be artificially induced in certain individuals if the individual is taught at an early age to read by the "sight" or holistic (whole word) method. Hence, it is believed that once children learn the holistic or look-say method, reading problems will occur as more complicated words appear in advanced grades and more difficult reading materials. Pre-school children are usually taught to read by looking at pictures and pronouncing words associated with them. By the time many children reach kindergarten, they have mastered a sight vocabulary of several hundred words, making first grade reading a "snap". However, once the children develop an automatic ability to identify words configurationally or wholly, a cognitive block which is associated with dyslexia can occur when words of more complexity are encountered.

Tests have recently been devised which demonstrate that many children diagnosed as "dyslexic" are merely children that have learned to read holistically instead of phonetically. Such a test includes two sets of words. The first set has over 200 sight words drawn from Dr. Seuss' books, "Green Eggs And Ham" and "The Cat In The Hat". The second set of words includes about the same number of equally simple words drawn from Rudolf Fleschis' "Why Johnny Can't Read". The test is conducted by measuring the speed at which a child reads both set of words and by counting the errors made in the reading of the two word-sets. The test subject must identify the words in the first or holistic set at a rate of 30 words per minute or greater with more than an 80 percent accuracy. If the student reaches this minimum threshold, the phonetic set is then undertaken. If 5 words or more are missed in the phonetic set, then the child is considered half as dyslexic as a child that missed 10 words in the same word set and the degree of dyslexia can be calculated. It has been found that most subjects can correct approximately 50-100 percent of the words which are missed in the phonetic set if they go back and orally spell each letter of the words missed. Thus, this two part test has been shown to be a method of identifying whether a child decodes words phonetically or holistically. It also provides a measure of the degree of dyslexia the child may have.

With this background in mind, it is an objective of the present invention to improve the reading skills of those children and adults that have been diagnosed as dyslexic.

It is another objective of the present invention to provide reading materials which will alter or help alter the reading processes of holistic readers.

It is still another objective of the present invention to provide a method of manufacturing reading materials which will increase the reading abilities and/or learning abilities of students.

Various other objectives and advantages of the invention will become clear to those skilled in the art as a more detailed explanation of the methods herein is set forth below.

SUMMARY OF THE INVENTION

The aforesaid and other objectives are realized by providing reading material for students, and particularly for students who suffer from reading disabilities such as dyslexia as has been educationally induced by improper or faulty teaching methods. More specifically, many children that are taught to read by the "sight" or holistic method have difficulty in altering their cognitive reasoning and confuse or are otherwise unable to distinguish certain words, The method herein provides for reading materials which have been designed to greatly assist such persons with text which increases the reader's ability to overcome such problems. The manufacture of such materials can be done manually or electromechanically and comprises the removal of certain common or "sight" words from written text. The text is then printed with the sight words removed and it provides a medium to improve the reader's ability by forcing phonetic decoding.

DESCRIPTION OF THE PREFERRED EMBODIMENT

Figure 1:
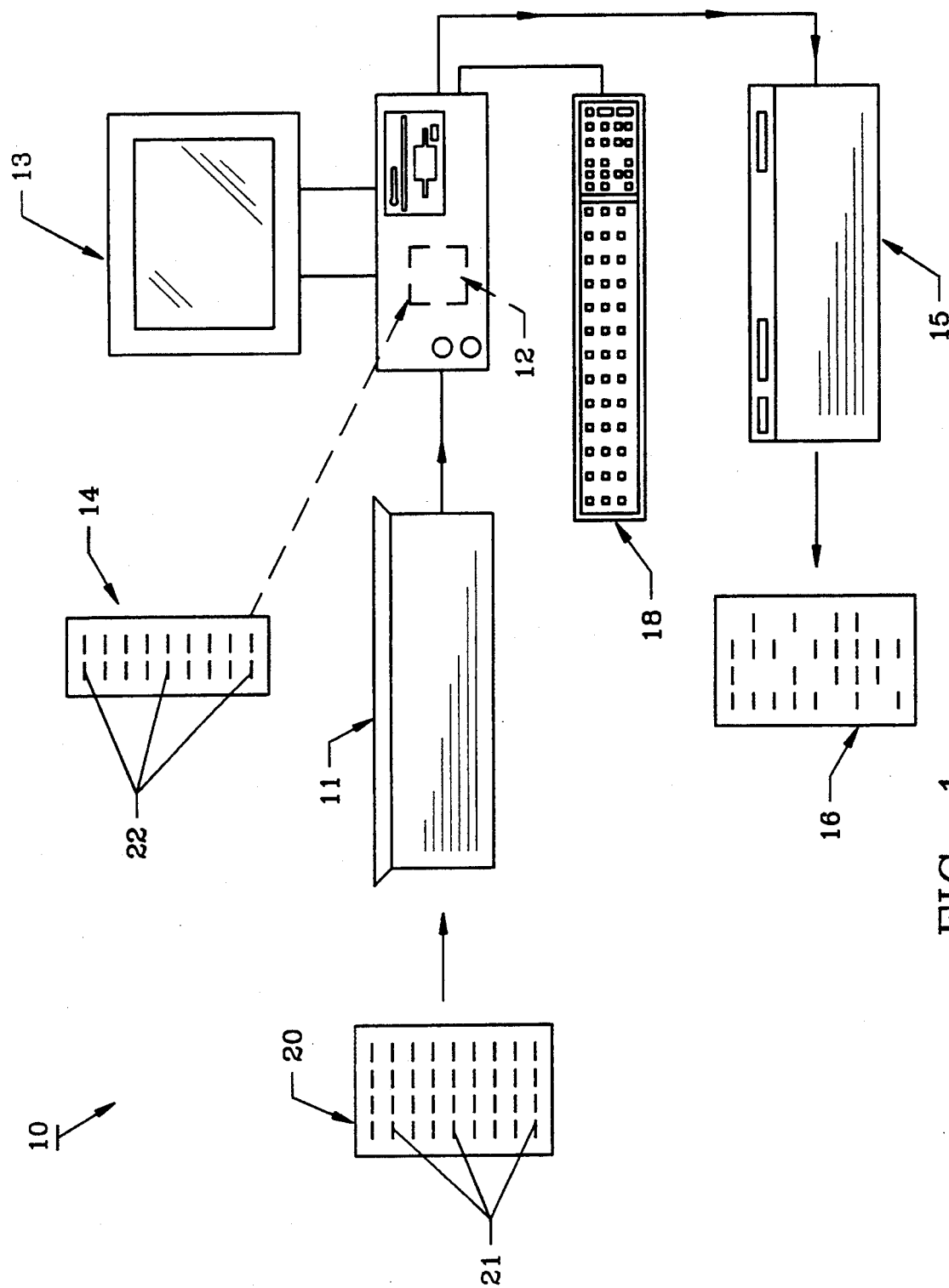
FIG. 1 depicts a schematic representation of the hardware used and flow pattern of the method of the invention.

The preferred method of manufacturing text materials to assist those with reading disabilities includes the steps of first forming a list of sight words such as certain common 2-6 letter words. The list of sight words is then input into the memory of a conventional computer with software designed to access the words on the list and compare to each word of original text which is likewise input into the memory of the computer. The computer program utilized is designed to then compare each word of the text to the list of sight words and to delete from the text any sight word which it encounters. The text, with the sight words deleted is then printed. Those diagnosed as dyslexic are then allowed to read the altered printed text and repetitive reading of the text improves their reading abilities as can be demonstrated, and over time will allow them to gradually change from holistic or sight decoding to phonetic decoding, thus greatly improving their reading and learning ability. A preferred list of sight words is shown below as Schedule A.

tain reading disabilities such as may be referred to an educationally-induced dyslexia. Original text 20 may be a written/printed paragraph, story, poetry, or the like which is read or decoded for example by conventional scanner 11 which is connected to computer 13, comprising a conventional desk top computer. Data is delivered to memory 12 of computer 13 by the use of conventional software so designed. Computer 13 also receives high frequency word list 14 which may have 200 or more words which is stored in memory 12 of computer 13. Sight words as used herein are words learned holistically on sight by dyslexic students. These words may be high frequency words that are often encountered. Once text 20 is placed in memory 12, computer 13, with suitable software, can then compare words 21 on text 20 to

| Schedule A | | | | | |
|---|---|---|---|---|---|
| 1. Sam | 45. book | 89. have | 133. not | 177. sunny | 221. will |
| 2. am | 46. bow | 90. He | 134. now | 178. sun | 222. wood |
| 3. anywhere | 47. box | 91. head | 135. nothing | 179. stop | 223. would |
| 4. box | 48. bump | 92. hear | 136. of | 180. string | 224. yellow |
| 5. boat | 49. but | 93. her | 137. oh | 181. stand | 225. yet |
| 6. car | 50. cat | 94. here | 138. one | 182. take | 226. yes |
| 7. dark | 51. cake | 95. hit | 139. out | 183. tall | 227. you |
| 8. eggs | 52. came | 96. high | 140. on | 184. tame | 228. yours |
| 9. eat | 53. can | 97. him | 141. our | 185. tail | 229. his |
| 10. fox | 54. call | 98. hold | 142. pat | 186. tell | 230. by |
| 11. green | 55. come | 99. hook | 143. pack | 187. things | 231. or |
| 12. goat | 56. cold | 100. hop | 144. pink | 188. this | 232. an |
| 13. ham | 57. could | 101. house | 145. pick | 189. those | 233. which |
| 14. here | 58. cup | 102. how | 146. playthings | 190. that | 234. were |
| 15. like | 59. day | 103. if | 147. plop | 191. there | 235. their |
| 16. let | 60. dear | 104. in | 148. play | 192. then | 236. been |
| 17. mouse | 61. deep | 105. is | 149. pot | 193. these | 237. has |
| 18. me | 62. did | 106. it | 150. put | 194. things | 238. who |
| 19. may | 63. dish | 107. jump | 151. rake | 195. they | 239. more |
| 20. not | 64. do | 108. kick | 152. ran | 196. thump | 240. said |
| 21. rain | 65. down | 109. kind | 153. red | 197. think | 241. its |
| 22. tree | 66. dots | 110. kite | 154. rid | 198. them | 242. into |
| 23. train | 67. fall | 111. last | 155. said | 199. the | 243. than |
| 24. try | 68. fan | 112. like | 156. Sally | 200. tip | 244. only |
| 25. thank | 69. fast | 113. lit | 157. sat | 201. top | 245. other |
| 26. about | 70. fear | 114. little | 158. say | 202. toy | 246. time |
| 27. after | 71. fell | 115. lots | 159. saw | 203. too | 247. may |
| 28. all | 72. find | 116. looked | 160. sad | 204. to | 248. first |
| 29. always | 73. fish | 117. let | 161. see | 205. two | 249. such |
| 30. and | 74. fox | 118. look | 162. shake | 206. tricks | 250. over |
| 31. another | 75. for | 119. made | 163. shame | 207. us | 251. even |
| 32. are | 76. fun | 120. make | 164. she | 208. up | 252. most |
| 33. as | 77. funny | 121. man | 165. sank | 209. wall | 253. many |
| 34. at | 78. fly | 122. mat | 166. sit | 210. want | 254. before |
| 35. away | 79. from | 123. me | 167. should | 211. way | 255. must |
| 36. back | 80. game | 124. mess | 168. show | 212. was | |
| 37. bad | 81. get | 125. milk | 169. ship | 213. we | |
| 38. ball | 82. go | 126. mind | 170. shook | 214. wet | |
| 39. be | 83. good | 127. mother | 171. shut | 215. went | |
| 40. bent | 84. got | 128. my | 172. shine | 216. wish | |
| 41. bet | 85. hat | 129. near | 173. so | 217. with | |
| 42. big | 86. hall | 130. net | 174. some | 218. what | |
| 43. bit | 87. hands | 131. new | 175. something | 219. when | |
| 44. books | 88. had | 132. no | 176. step | 220. why | |

The sight word list above includes 255 words. This list is an example only and other sight words could be included as elementary reading books change. The original text as stated herein can be pages from newspapers, novels and other books or the like and as such can be adjusted to suit a particular person who is being tested and administered.

DETAILED DESCRIPTION OF THE DRAWINGS AND EXPLANATION OF THE INVENTION

Turning now to the drawing, FIG. 1 demonstrates in schematic fashion a flow pattern 10 for a method to provide reading materials for those suffering from cerwords from list 14 as held in memory 12. Words 22 on list 14 are encountered during processing in text 20 and when deletions have been completed, printer 15 (as by conventional programming) then prints text 16 which of course consists of original text 20 minus the words 22 as found on list 14. Text 16 is then provided to, for example a student with "induced" dyslexia and the student is allowed to read (decode) altered text 16 which generally consists of words mostly unfamiliar to the student, thereby forcing the student to phonetically read the text. As the student reads and rereads text 16 his or her reading abilities will improve and additional altered text of a more advanced nature can then be provided, having words which are rarer and with more syllables. As would be understood, the programming of computer 13 and the software involved can be carried out by those skilled in the art with variations, depending on the particular hardware and software characteristics desired. For example, high frequency word list 14 could likewise be scanned into computer 13 or it could be placed in memory 12 by using a typical keyboard 18. Likewise, text 20 could be input into computer 13 by keyboard 18 although this process is generally slower than the use of a conventional text scanner.

In addition to the process of forming altered text 16 as shown in FIG. 1, text 20 could likewise be altered manually, for example by blacking out words identical to a prepared sight word list such as by coloring over each word 21 with a marker or pigmented solution as are commonly available.

The exact details of programming computer 13 are not specifically explained herein but are well within the ability and knowledge of those skilled in the programming art. In addition, the other illustrations and examples shown are for explanatory purposes and other testing methods and materials may be used. Also, other methods of preparing text 20 can likewise be used without departing from the scope of the appended claims.

I claim:

1. A method of improving the skill of a reader comprising the steps of:
   (a) testing the ability of the reader;
   (b) determining the reader's skill;
   (c) preparing text having a plurality of words;
   (d) artificially comparing each word in the text to a specific list of sight words;
   (e) deleting words from the text that match the sight words; and
   (f) printing the text with the matching words deleted.

2. The method of claim 1 and including the step of reading the printed text.

3. The method of manufacturing reading material to help students improve their reading skills comprising the steps of:
   (a) preparing text having a plurality of words;
   (b) preparing a specific list of sight words;
   (c) artificially comparing each word of the text to the list of sight words;
   (d) deleting words from the text that match the sight words; and
   (e) printing the text with the matching words removed.

4. The method of claim 3 wherein the step of comparing the text words to the sight words comprises the step of electronically comparing the text words to the sight words.

5. The method of claim 3 and including the step of reading the printed text.

6. The method of claim 3 wherein the step of preparing a specific list of sight words comprises the step of entering said sight words into memory.

7. A method of reading, comprising the steps of:
   (a) preparing text having a plurality of words;
   (b) providing a list of common words;
   (c) electronically altering the text by deleting words from the text that match words in the list of common words; and
   (d) reading the altered text.

8. The method of reading as set out in claim 7, further comprising the step of printing the altered text.

9. The method of reading as set out in claim 7, wherein said list of common words comprises a plurality of monosyllabic words.

10. The method of reading as set out in claim 7, wherein said list of common words comprises over 200 words.

* * * * *